(12) United States Patent
Brodam

(10) Patent No.: US 8,650,815 B2
(45) Date of Patent: Feb. 18, 2014

(54) SOLAR MODULE FRAMES HAVING WATER DRAIN

(75) Inventor: Michael Brodam, Sankt Augustin (DE)

(73) Assignee: SAPA GmbH, Dusseldorf (DE)

( * ) Notice: Subject to any disclaimer, the term of this patent is extended or adjusted under 35 U.S.C. 154(b) by 0 days.

(21) Appl. No.: 13/062,087

(22) PCT Filed: Sep. 2, 2009

(86) PCT No.: PCT/EP2009/006354
§ 371 (c)(1),
(2), (4) Date: Mar. 29, 2011

(87) PCT Pub. No.: WO2010/025903
PCT Pub. Date: Mar. 11, 2010

(65) Prior Publication Data
US 2011/0180680 A1    Jul. 28, 2011

(30) Foreign Application Priority Data
Sep. 3, 2008 (DE) ......................... 10 2008 045 510

(51) Int. Cl.
E04F 15/00 (2006.01)

(52) U.S. Cl.
USPC ............................................................ 52/177

(58) Field of Classification Search
USPC ................ 52/656.1, 656.2, 656.5, 173.3; 248/346.01, 346.4
See application file for complete search history.

(56) References Cited

U.S. PATENT DOCUMENTS

| | | | | |
|---|---|---|---|---|
| 2,989,788 A * | 6/1961 | Kessler | .......................... | 403/295 |
| 4,838,951 A | 6/1989 | Riermeier et al. | | |
| 5,378,077 A * | 1/1995 | Paulsen | .......................... | 403/402 |
| 6,332,657 B1 * | 12/2001 | Fischer | ........................... | 312/111 |
| 7,484,819 B2 * | 2/2009 | Frederick et al. | .......... | 312/257.1 |
| 7,571,574 B2 * | 8/2009 | Yu | .................................... | 52/213 |
| 2007/0234677 A1 * | 10/2007 | Sironko et al. | ............... | 52/656.1 |

FOREIGN PATENT DOCUMENTS

| | | |
|---|---|---|
| DE | 36 11 542 A1 | 10/1987 |
| DE | 3611542 A1 * | 10/1987 |
| DE | 10321422 A1 | 1/2005 |
| DE | 102006053830 B3 | 2/2008 |
| DE | 202007016429 U1 | 3/2008 |
| DE | 102006061284 A1 | 6/2008 |
| DE | 102006061284 A1 * | 6/2008 |
| EP | 0200050 A1 | 11/1986 |
| EP | 1398452 A1 | 3/2004 |
| WO | WO-9508041 A1 | 3/1995 |
| WO | WO-0002256 A1 | 1/2000 |

OTHER PUBLICATIONS

Non-English Search Report issued in a related German application on Sep. 15, 2011.

* cited by examiner

*Primary Examiner* — Joshua J Michener
*Assistant Examiner* — Keith Minter
(74) *Attorney, Agent, or Firm* — Loeb & Loeb LLP

(57) ABSTRACT

The invention relates to a frame for a solar module, wherein the frame comprises a plurality of aluminum extruded profiles, which form the sides of the frame and which are connected to each other at the corners thereof, wherein at least one aluminum extruded profile comprises at least one hollow chamber, wherein the frame comprises corner elements, wherein at least one corner element comprises a discharge opening, and the discharge opening is connected to a hollow chamber of at least one adjacent aluminum extruded profile.

14 Claims, 6 Drawing Sheets

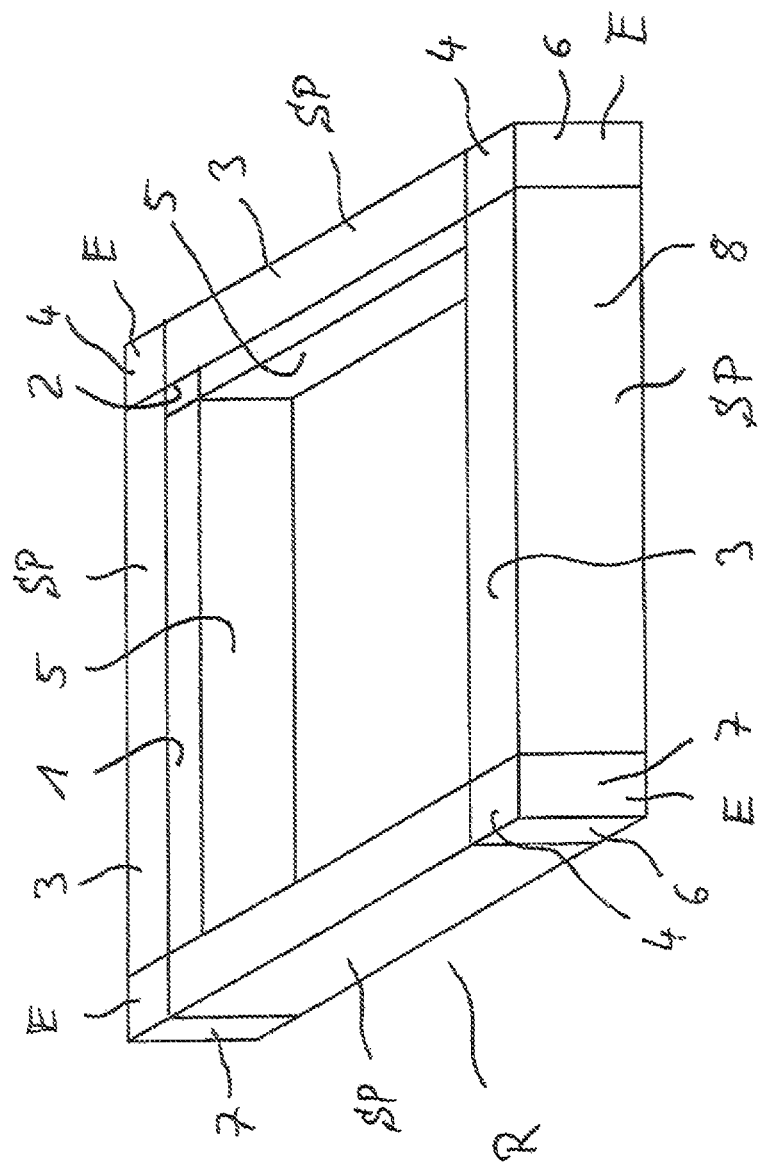

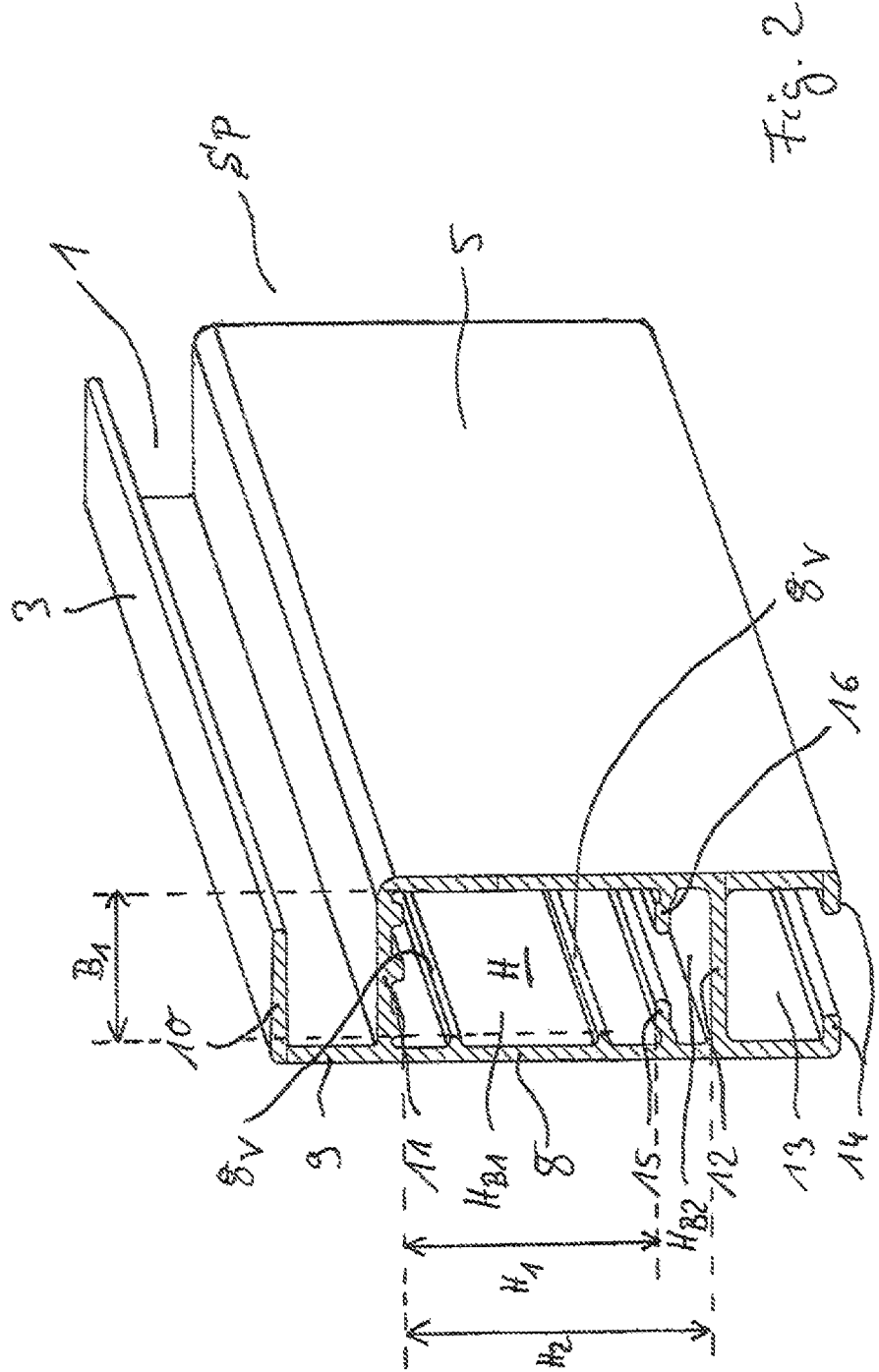

SOLAR MODULE FRAMES HAVING WATER DRAIN

CROSS-REFERENCE TO RELATED APPLICATIONS

This application is a 35 U.S.C. 371 National Stage Application of International Application No. PCT/EP2009/006354, filed Sep. 2, 2009, claiming priority from German Application No. 10 2008 045 510.5, filed Sep. 3, 2008, the entire contents of which are incorporated herein in their entirety.

The present invention relates to a frame for a solar module, wherein the frame comprises a plurality of aluminium extruded profiles, which form the sides of the frame and which are connected to one another at the corners thereof, wherein at least one aluminium extruded profile comprises at least one hollow chamber.

Frames for solar modules are often produced from aluminium extruded profiles. The extruded profiles are in the process sawn to length and mitred and connected to one another by means of insertable corner connectors. When frost occurs, any rainwater or condensation water which may have penetrated can damage or destroy the frame. To prevent this, it is essential to make sure that the water can flow out of the frame. Holes are drilled or punched into the hollow chambers of the frame for this purpose. The mitre-cut profiles are connected to one another by means of corner connectors.

A solar module is known from DE 3611542 A1, in which extruded profiles are connected to one another by means of corner joint parts. The corner joint parts and the extruded hollow profiles are manufactured from aluminium. The corner joint parts seal the hollow chambers of the extruded hollow profiles on the face side, so that the water located in the hollow chambers cannot drain away.

DE 10 2006 061 284 A1 discloses a solar module the frame of which is also produced from shaped profiles which are linked to one another by plug-in corner joint parts. The corner joint parts are designed so that the water located in the hollow chambers can drain away via the openings formed through the corner joint parts. The corner joint parts link the shaped profiles to one another and are manufactured from plastic. As a result of this, the solar module retains only a slight rigidity.

A frame system for solar collectors is known from DE 20 2007 016 429 U1, in which the frame is formed by hollow chamber profiles which are connected by means of connectors which are pressed into the hollow chambers of the hollow chamber profiles on the face side. The connectors are formed so that by using seals they seal the hollow chamber profiles to the outside. Condensation water which is formed in the hollow chambers cannot therefore drain away.

DE 10 2006 053 830 B3 also discloses a frame component for solar cells, in which the frame is formed from profile rods which are connected to one another by corner joint elements. The corner joint elements comprise protruding fingers which are pressed into the hollow chambers of the profile rods, whereby the hollow chambers are sealed on the face side by the fingers. Condensation water cannot therefore drain out of the hollow chambers of the profile rods.

The disadvantage with the above described frames is the extra effort required to produce the discharge holes and the holes for the electrical equipotential bonding.

The object of the present invention is to further develop a frame, which is produced from aluminium extruded profiles, to the effect that no discharge drill holes have to be incorporated into the extruded profiles of the frame.

This object is achieved according to the invention by a frame having the features of claim 1.

At the same time, it is particularly advantageous for the aluminium extruded profiles to be electrically connected to electrically conductive connectors which can be inserted into the open face sides of the aluminium extruded profiles. Electrical equipotential bonding is hereby ensured between all frame parts.

The connectors at the same time can be or are advantageously pressed in a force-fit manner into the open face sides of the aluminium extruded profiles. A secure and stable connection is hereby produced between the extruded profiles. The connectors advantageously comprise ribs which, after they have been inserted into the face sides, press with their ends against the inner wall of the aluminium extruded profiles, so that the connectors cannot inadvertently slip out of the face sides of the extruded profiles. The ribs are in the process only integrally formed with one side onto the base body of the connectors and can easily spring away towards one side when inserted.

In addition, the connector is advantageously formed as an extruded profile which is cut to length. The base body of the connector is formed by two plates which are integrally formed together at right angles to one another, from the flat sides of which the ribs in each case protrude outwards and/or inwards at an angle. The angle can be between 90° and 20°. The angle of a rib is advantageously 45° in relation to the plates of the base body. The width of the plates at the same time advantageously corresponds to the height of a hollow chamber of the aluminium extruded profile. Ultimately, any length of the plates of the connector and hence any penetration depth into the face side openings of the aluminium extruded profiles of the frame can be chosen. Sufficient stability should, however, be ensured. The connector can also be manufactured from aluminium.

The corner element can advantageously be attached to a connector. In this way, connector and corner element can be designed so that the corner element can be slid onto the connector or attached to this by means of a snap-in or snap-fit connection. Additional fixing means, like for example screws, can be provided for attaching the corner element to the connector. However, these not only increase the production but also add to the time and effort required to assemble the frame according to the invention.

In one preferred embodiment, a corner element comprises two sides which are in particular arranged perpendicular to one another and which are arranged parallel to the face sides of the aluminium extruded profiles and abut on these in the assembled state.

Advantageously, the aluminium extruded profiles are not mitred to 45°, so that outer walls of the aluminium extruded profiles do not adjoin one another and the frame ultimately has sharp-edged corners. In fact, the invention makes provision for the corners of the frame to be formed by the corner elements. The corner elements can be manufactured from aluminium or plastic. Plastic is appropriate if the corners have to be made of a material which is a bit softer, so that the corner elements when fitting the frame at one corner are not damaged or ultimately only the easily replaceable corner element is damaged or ruined. Preferably, the corners of the corner elements can be round or at least rounded.

In one particularly preferred embodiment, the corner elements are designed in such a way that they connect aluminium extruded profiles to one another which are cut exactly to length and are arranged at right angles to one another, so that only negligible gaps occur between the walls abutting one another.

It is advantageous if the corner elements, in particular with their visible outer walls, adjoin in alignment the outer walls of the adjacent aluminium extruded profiles, so that only negligible gaps, if any, occur between the components. It is also possible for the corner elements to overlap the adjacent outer walls of the aluminium extruded profiles, so that no gaps are visible between the components.

The corner element advantageously comprises three outer walls adjoining one another, wherein projecting parts, in particular walls, protruding inwardly emanate from two of the outer walls, with which the corner element can be attached to the connector, in particular can be slid onto at least two ribs of the connector.

An aluminium extruded profile advantageously comprises a hollow chamber which is subdivided into two areas by means of at least one inwardly protruding ledge-shaped wall, wherein the one first, in particular larger, area serves to receive a connector on the face side and the second area of the hollow chamber serves as a water drainage channel. The two areas are at the same time connected to one another over the entire length of the extruded profile. The water drainage channel, according to one embodiment of the invention, is connected to an area of a corner element, at least one wall section of which forms the discharge opening, so that water which has penetrated can drain out of the frame. The discharge opening here is advantageously arranged on the bottom side, which in most cases due to the arrangement of the frame also is the bottom side.

The aluminium extruded profiles can comprise a channel, which is open to the rear side, for gripping around the border of solar modules. The solar modules are hereby gripped around from all sides and do not have to be additionally attached to the frame by fixing means. The corner elements can also comprise a corresponding reception space for the corner of a solar module, which is formed by a front wall together with a wall, which is parallel to it, and the side walls of the corner element.

Different possible embodiments will now be explained in more detail below with the aid of drawings.

FIG. 1 shows a perspective view of a frame;

FIG. 2 shows a sectional perspective illustration of an aluminium extruded profile;

FIG. 4a shows a side view of the corner element according to FIG. 4;

FIGS. 4b and 4c show different views of the corner element according to FIG. 4;

Figure 2A:
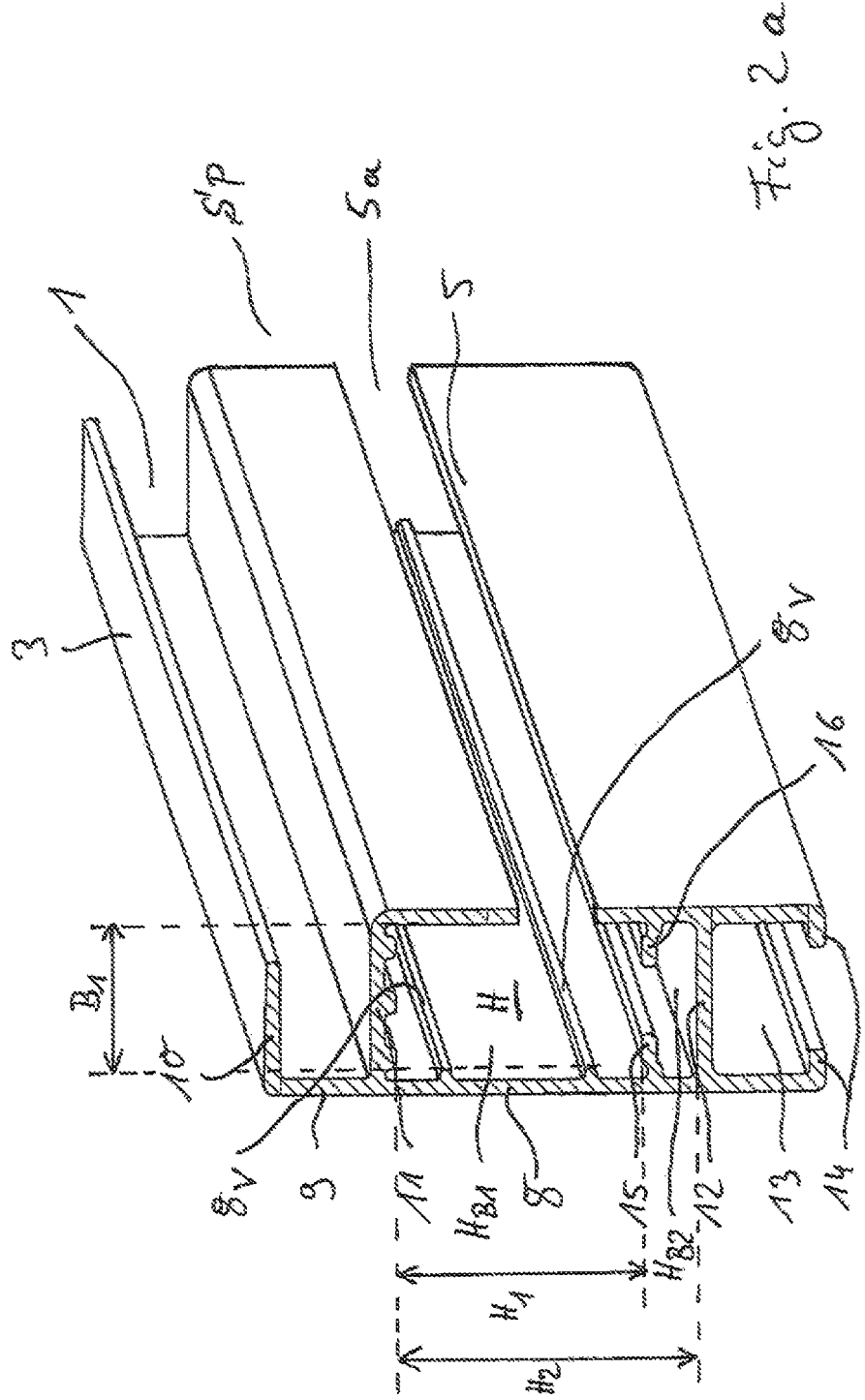
FIG. 2a shows a sectional perspective illustration of an aluminium extruded profile with a slit hollow space.

FIG. 1 shows the frame R according to the invention which is formed by the aluminium extruded profiles SP and the corner elements E. The corner elements E together with the extruded profiles SP form a reception space 1, 2 for the solar modules which are not shown in FIG. 1. The frame R comprises an upper side 3, 4 and side walls 6, 7, 8.

FIG. 2 shows a sectional perspective view of an aluminium extruded profile SP. The profile SP comprises a hollow chamber H which is subdivided into the areas $H_{B1}$ and $H_{B2}$ by means of the ledges 15, 16. The hollow chamber H is formed by the side walls 5, 8, 11 and 12. The area $H_{B1}$ serves to receive a connector V illustrated in FIG. 3 and comprises a height $H_1$ and a Width $B_1$, which is adapted to the width $L_v$ and thickness $D_p$ of the connector V (see FIG. 3). The area $H_{B2}$ serves as a water drainage duct or channel. The C-shaped profile 13, adjoining under the water drainage duct, with the inwardly directed collar-shaped walls 14 serves for attaching the frame R. Towards the upper side 3 the profile SP comprises a groove 1, opened towards the interior 5, which is formed by the walls 19 and 11, wherein a solar module, which is not illustrated, lies with its one edge in the groove 1.

Figure 3:
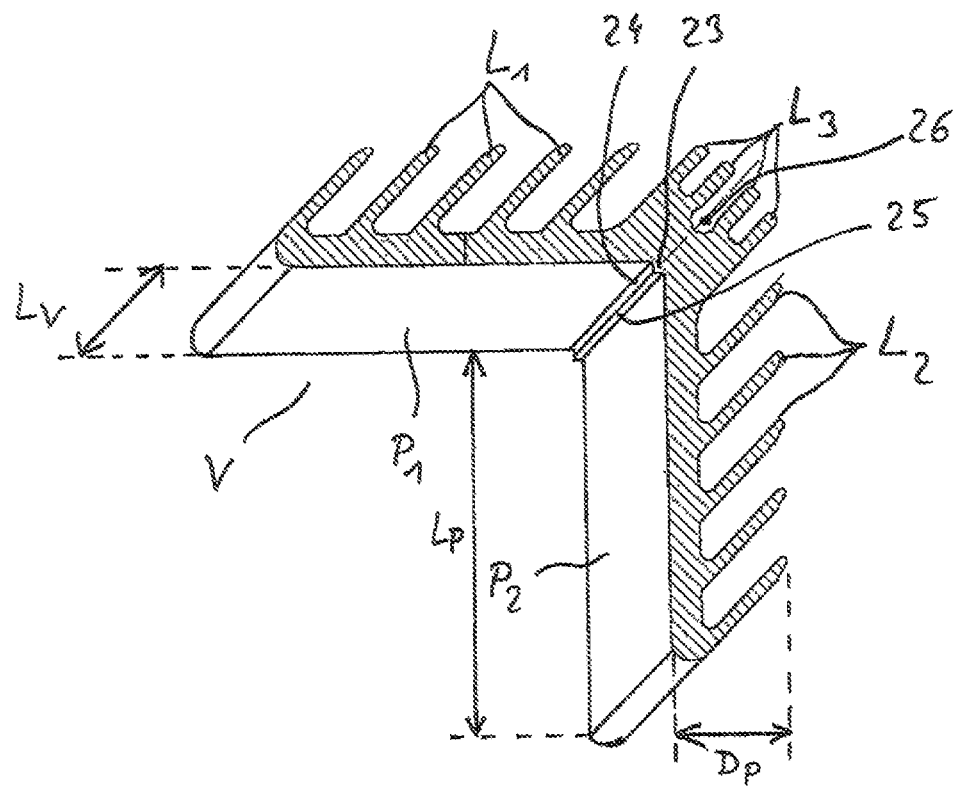
FIG. 3 shows a connector.

FIG. 2a shows another possible embodiment of the aluminium extruded profile SP. This hollow profile SP only differs from the one illustrated in FIG. 2 by the wall 5 of the hollow chamber H comprising a slit 5a. Hence, in terms of the invention, a chamber H is also regarded as a hollow chamber, which does not only comprise face side openings.

The connector V has a base body which is formed by the plates $P_1$ and $P_2$ which stand at right angles to one another and are integrally formed together, from which ribs $L_1$, $L_2$, $L_3$ extend at an angle of approx. 45°. The angle can be chosen according to the requirements. The ribs $L_1$ and $L_2$ serve to produce a contact pressure against the inner walls of the wall 8 or its projecting parts 8v arranged on it and protruding inwards. By pressing a leg of the connector V into the hollow space $H_{B1}$, the ribs $L_1$ and $L_2$ are slightly bent and as a result of this produce the required pressure force, so that the connector can only be pulled out of the extruded profile SP by a very strong force and possibly by destroying the extruded profile SP and/or connector V. The connector V is also an extruded profile cut to length $L_v$ and serves to electrically connect the extruded profiles, SP connected to one another via the connector V.

Figure 4:
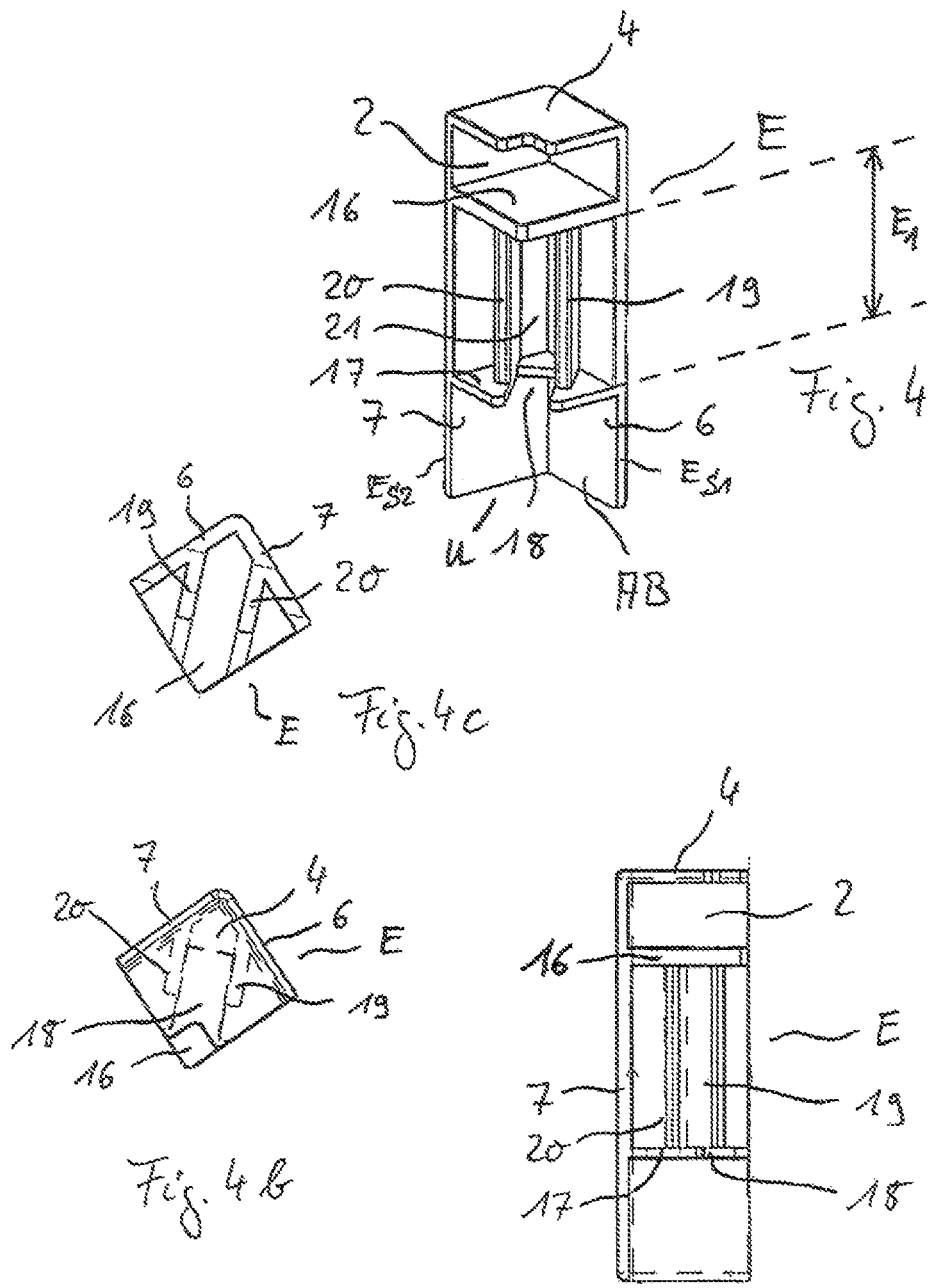
FIG. 4 shows a perspective illustration of a corner element.

The connector V comprises additional ribs $L_3$ which serve to connect to the corner element E illustrated in FIGS. 4 to 4c. On the inner corner the connector has a projecting part 23 which forms lateral stop faces 24 and 25. When inserting the connector into the hollow chamber H of an extruded profile SP, the extruded profile SP impacts with its face side wall against the stop faces 24 and 25. The contact surfaces 24 and 25 thus ensure that the extruded profiles SP adjoining one another exactly rest against one another with their corner edges.

The connector V also advantageously comprises a recess 26 which is in particular circular, into which a screw for equipotential bonding can be screwed. This recess can also be advantageously formed during extrusion, so that no more additional time and effort is required to subsequently drill an earthing hole on the extruded profile SP or the connector V.

A corner element E according to FIG. 4 comprises three outer walls 4, 6, 7, wherein the walls 6 and 7 form the side walls and the wall 4 forms a kind of lid. The three walls 4, 6 and 7 in each case are perpendicular to one another and form the outer shell of the corner element E.

The corner element E comprises two inner walls 16, 17 to provide rigidity, which are arranged parallel to the top wall 4 and at a distance $E_1$ from one another. The top wall 4 and the wall 16 form the reception space for a corner of a solar module which is not illustrated. A discharge opening 18 in the form of a recess is formed in the lower wall 17. The wall 17 lines up precisely with the projecting parts or walls 15 of the extruded profile SP illustrated in FIG. 2. By means of the opening 18 and owing to the fact that the corner element is open towards the bottom side, it is therefore possible for water which is located in the hollow space H, in particular in the discharge duct $H_{B2}$, to escape or drain away from the frame through the discharge opening 18. Walls 19 and 20, arranged at a 45° angle to the side walls 6 and 7, are formed between the walls 16 and 17. These walls 19, 20 with regard to their thickness are slightly thicker than the distance between the ribs $L_3$, so that when sliding the corner element E on this pushes between the ribs L₃ with its walls 19, 20, whereby the corner element is held securely in position by the ribs L₃. The corner element is also held securely in position in the vertical direction, i.e. parallel to the surface normal of the frame, by the walls 16, 17 which abut above and below on the ribs $L_l$.

FIG. 4a shows a side view of the corner element E. FIG. 4b shows a top view of the corner element E, wherein the walls 19 and 20 and the plate 16 are illustrated. FIG. 4c shows a sectional view of the corner element E in the area of the walls 19, 20.

Figure 5:
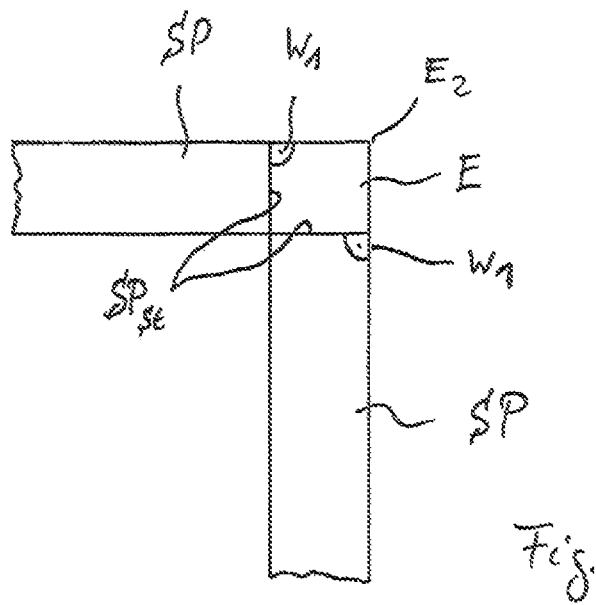
FIG. 5 shows a top view of a corner section of a frame.

FIG. 5 shows a top view of a corner E of the frame R according to the invention, as it is illustrated in detail in the previously described figures. The face sides $SP_{St}$ of the extruded profiles SP are cut to length at right angles (angle $W_1$) and abut on the corner element E with as few gaps as possible. The outermost corner edge $E_2$ is therefore formed by the corner element E.

Figure 6:
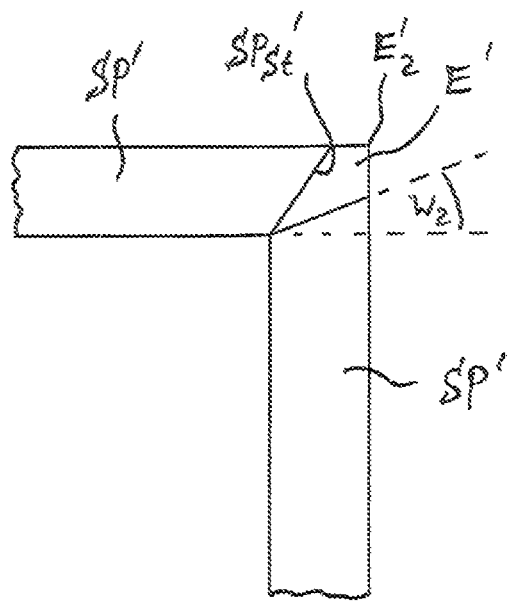
FIG. 6 shows a top view of a corner section of an alternative frame.

FIG. 6 shows an alternative configuration of the frame, wherein the extruded profiles SP' are not at right angles but deflected at an angle $W_2$. The corner element E' is correspondingly shaped, so that it fills out the area between the face sides $SP_{St}'$ of the two extruded profiles SP' adjoining one another and also forms a corner $E_2'$ of the frame. In this embodiment also a connector can be used according to FIG. 3 without modifications. This embodiment is only supposed to show that the corner element E' does not have to be designed as a rectangular element. However, the corner element E, according to FIGS. 1 to 5, shows the preferred configuration of a corner element E, since with this shape the extruded profiles SP can be cut to length easily and simply by adhering to the right angle.

The invention claimed is:

1. A frame for a solar module, wherein the frame comprises a plurality of aluminium extruded profiles, which form the sides of the frame and which are connected to one another at the corners thereof, wherein at least one aluminium extruded profile comprises at least one hollow chamber, wherein the frame comprises corner elements, wherein at least one corner element comprises a discharge opening, and the discharge opening is connected to a hollow chamber of at least one adjacent aluminium extruded profile, wherein the hollow chamber is subdivided into two areas by means of at least one inwardly protruding ledge-shaped wall, wherein the first area is larger and is adapted to receive a connector on face side and the second area of the hollow chamber is smaller and serves as a water drainage channel, and the first area and second area are connected to one another over the entire length of the aluminium extruded profile, wherein the aluminium extruded profiles are electrically connected by means of the electrically conductive connectors.

2. The frame according to claim 1, wherein the connectors can be pressed in a force-fit manner into open face sides of the aluminium extruded profiles.

3. The frame according to claim 1, wherein connectors comprise ribs which are adapted to be inserted into the face sides, and are adapted to press with their ends against inner wall of the aluminium extruded profiles.

4. The frame according to claim 1, wherein connectors are extruded profiles cut to length, and comprise aluminium.

5. The frame according to claim 1, wherein a corner element can be attached to a connector, can be slid on or attached by means of a snap-in or snap-fit connection.

6. The frame according to claim 1, wherein a corner element comprises two sides which are arranged perpendicular to one another and which are arranged parallel to the face sides of the aluminium extruded profiles and abut on these in assembled state.

7. The frame according to claim 1, wherein corner element, with its visible outer walls, adjoins in alignment the outer walls of adjacent aluminium extruded profiles.

8. The frame according to claim 1, wherein the corner element comprises three outer walls adjoining one another forming a corner, and from the corner projecting parts comprising walls that protrude inwardly and emanate from at least two of the outer walls, wherein the corner element can be attached to the connector, by sliding onto at least two ribs of the connector.

9. The frame according to claim 1, wherein the water drainage channel is connected to an area of the corner element, wherein a lower wall section forms the discharge opening.

10. The frame according to claim 1, wherein the aluminium extruded profiles comprise a channel, which is open to the interior of the frame, for gripping around the border of solar modules.

11. The frame according to claim 1, wherein the corner element comprises a front wall which, together with a wall, which is parallel to it, and side walls, forms a reception space for corner of a solar module.

12. The frame according to claim 1, wherein the corner element is manufactured from aluminium or plastic.

13. The frame according to claim 1, wherein the connector comprises a recess for screwing in a screw for equipotential bonding, wherein the recess is formed during the extruding process.

14. The frame according to claim 13, wherein the recess extends in the longitudinal extent of the connector, which is cut to length and formed as an extruded profile, in such a way that the screw axis of the screw for equipotential bonding runs parallel to the normal surface of the frame and securely holds the connector in the vertical direction.

* * * * *